United States Patent
Zhuang et al.

(10) Patent No.: US 12,451,104 B2
(45) Date of Patent: Oct. 21, 2025

(54) IMAGE PROCESSING SYSTEM AND METHOD BASED ON FOVEATION PRINCIPLE AND STORAGE MEDIUM

(71) Applicant: GravityXR Electronics and Technology Co., Ltd., Ningbo (CN)

(72) Inventors: Jiayan Zhuang, Ningbo (CN); Lijun Li, Ningbo (CN); Chaohao Wang, Ningbo (CN)

(73) Assignee: GravityXR Electronics and Technology Co., Ltd., Ningbo (CN)

( * ) Notice: Subject to any disclaimer, the term of this patent is extended or adjusted under 35 U.S.C. 154(b) by 0 days.

(21) Appl. No.: 18/932,658

(22) Filed: Oct. 31, 2024

(65) Prior Publication Data

US 2025/0054466 A1    Feb. 13, 2025

Related U.S. Application Data

(63) Continuation of application No. PCT/CN2023/106692, filed on Jul. 11, 2023.

(30) Foreign Application Priority Data

Aug. 26, 2022   (CN) .......................... 202211032460.3

(51) Int. Cl.
G09G 5/391        (2006.01)
G06F 3/01         (2006.01)

(52) U.S. Cl.
CPC ............. *G09G 5/391* (2013.01); *G06F 3/013* (2013.01); *G09G 2340/0407* (2013.01)

(58) Field of Classification Search
CPC ............ G09G 5/391; G09G 2340/0407; G06F 3/013; G06F 3/01; G06T 1/20
See application file for complete search history.

(56) References Cited

U.S. PATENT DOCUMENTS

2018/0081178 A1* 3/2018 Shpunt ................. H04N 13/383
2018/0136720 A1* 5/2018 Spitzer ...................... G06T 1/20
(Continued)

FOREIGN PATENT DOCUMENTS

CN      109791433 A      5/2019
CN      109891381 A      6/2019
(Continued)

OTHER PUBLICATIONS

International Search Report of International Application No. PCT/CN2023/106692.
(Continued)

*Primary Examiner* — Temesghen Ghebretinsae
*Assistant Examiner* — Ivelisse Martinez Quiles
(74) *Attorney, Agent, or Firm* — Kilpatrick Townsend & Stockton LLP (57) ABSTRACT

The disclosure provides an image processing system, a method, a storage medium and an extended reality display device. The image processing system includes a display pipeline and an image processing pipeline. The display pipeline obtains an eye movement signal of a user and performs a first foveal process according to the eye movement signal. The display pipeline also generates a frame synchronization signal according to the eye movement signal, and transmits the frame synchronization signal to the image processing pipeline, for the image processing pipeline to perform a second foveal process according to the frame synchronization signal. By adopting this configuration, the image processing system can comprehensively improve image quality, power consumption, real-time performance and user experience of image processing by the joint interaction and reuse of the display pipeline and the image processing pipeline, to comprehensively improve the current shortage of computing power in XR high frame rate display.

15 Claims, 2 Drawing Sheets

(56) References Cited

U.S. PATENT DOCUMENTS

2021/0166341 A1   6/2021  Bastani et al.
2022/0084301 A1   3/2022  Joshi et al.
2022/0262079 A1   8/2022  Croxford et al.

FOREIGN PATENT DOCUMENTS

CN      112506347 A   3/2021
CN      112887646 A   6/2021
TW      202328871 A   7/2023

OTHER PUBLICATIONS

Shawn Matthews et al, "Rendering Optimizations for Virtual Reality Using Eye-Tracking", DOI 10.1109/SVR51698.2020.00066.

Zipeng Zheng, "Research on VR rendering optimization algorithm driven by gaze point data", School of Computers, Guangdong University of Technology, May 2020.

Long Zhe, "The Application of the Big Data of Eye Tracking in the Optimization of Image Quality", College of Information Engineering, Xiangtan University, Apr. 2016.

\* cited by examiner

IMAGE PROCESSING SYSTEM AND METHOD BASED ON FOVEATION PRINCIPLE AND STORAGE MEDIUM

This application is a continuation of International Patent Application No. PCT/CN2023/106692, filed on Jul. 11, 2023, which claims the priority of a patent application with a filing date of Aug. 26, 2022, a China application number of 202211032460.3, and a title of "Image processing system, method based on foveal principle and storage medium", which are hereby incorporated by reference in their entireties.

TECHNICAL FIELD

The disclosure relates to extended reality display technology, in particular to an image processing system based on foveation principle, an image processing method based on foveation principle, an extended reality display device, and a computer-readable storage medium.

BACKGROUND

Extended Reality (XR) display technology refers to the technology that combines reality and virtuality through computers to create a human-computer interactive virtual environment, including but not limited to augmented reality (AR) display technology, virtual reality (VR) display technology, and mixed reality (MR) display technology. By integrating these three visual interaction technologies, extended reality display technology can provide users with immersive experiences of seamless transition between the virtual world and the real world.

For the demands of high frame rate display in the XR field, existing technologies generally use display pipelines to process virtual rendering images or composite overlaid images based on foveation principle, however there is a lack of joint interaction and reuse with image signal processing (ISP) pipelines. Although it can improve image processing quality and user experience, it has the drawbacks of high-power consumption and high latency. If the foveal image processing operation is simply transferred to the display drive integrated circuit (DDIC) of the ISP pipeline for processing, there will be a lack of display pipeline processing capability based on gaze points on both the ISP pipeline and DDIC, which cannot support complex and fine compensation and has limited effectiveness.

In order to overcome the above-mentioned shortcomings of existing technologies, this field urgently needs an extended reality display technology to comprehensively improve image processing effects in various aspects such as the image quality, power consumption, real-time performance and user experience of image processing, to comprehensively improve the current shortage of computing power in XR high frame rate display.

SUMMARY

A brief overview of one or more aspects is provided below to provide a basic understanding of these aspects. The summary is not an extensive overview of all of the aspects that are contemplated, and is not intended to identify key or decisive elements in all aspects. The sole purpose of the summary is to present some concepts of one or more aspects in a simplified form as a prelude to the more detailed description that is presented later.

In order to overcome the above-mentioned shortcomings of existing technologies, the disclosure provides an image processing system based on foveation principle, an image processing method based on foveation principle, an extended reality display device and a computer-readable storage medium, which can comprehensively improve image processing effects in various aspects such as the image quality, power consumption, real-time performance and user experience of image processing, by the joint interaction and reuse of the display pipeline and the image processing pipeline, to comprehensively improve the current situation of high frame rate display computing power shortage in XR.

Specifically, according to image processing system based on foveation principle provided in the first aspect of the disclosure comprises a display pipeline and an image processing pipeline. The display pipeline obtains an eye movement signal of a user and performs a first foveal process according to the eye movement signal. The display pipeline also generates a frame synchronization signal according to the eye movement signal and transmits the frame synchronization signal to the image processing pipeline, for the image processing pipeline to perform a second foveal process according to the frame synchronization signal.

Furthermore, in some embodiments of the disclosure, the frame synchronization signal comprises the eye movement signal, a gaze area data and/or a grid matrix weight map data. The gaze area data indicates coordinate positions of a gaze point of the user and/or a surrounding pixel thereof in an image. The grid matrix weight map data indicates an attention level of the user to multiple regions in the image.

Furthermore, in some embodiments of the disclosure, the display pipeline is configured as: determining the gaze area data of the user according to the eye movement signal; generating the grid matrix weight map data according to the gaze area data; performing the first foveal process according to the grid matrix weight map data; and generating the frame synchronization signal according to the eye movement signal, the gaze area data and/or the grid matrix weight map data.

Furthermore, in some embodiments of the disclosure, the display pipeline comprises a display hardening unit and a first software processing unit. The display hardening unit is connected to an eye tracker via the first software processing unit to obtain the eye movement signal, and performs the first foveal process according to the eye movement signal. The first software processing unit connects the image processing pipeline to the display hardening unit, and synchronously aligns the frame synchronization signals of a same frame image in the image processing pipeline and the display hardening unit.

Furthermore, in some embodiments of the disclosure, the image processing pipeline comprises an image processing hardening unit and a second software processing unit. The image processing hardening unit is connected to the display pipeline, and obtains the frame synchronization signal through the display pipeline to perform the second foveal processing based on at least one of the hardening calculation circuits according to the frame synchronization signal. The second software processing unit is connected to the display pipeline, and obtains the frame synchronization signal through the display pipeline to perform the second foveal processing based on at least one software program therein according to the frame synchronization signal.

Furthermore, in some embodiments of the disclosure, the image processing hardening unit is configured with hardening calculation circuits. At least one of the hardening calculation circuit is configured with an independent switch. The hardening calculation circuit performs independent second foveal process according to a switch signal of the corresponding switch.

Furthermore, in some embodiments of the disclosure, the second software processing unit extracts an image feature of a current frame image frame by frame, and configures the switch signal of each switch in real-time according to the image feature, to control one or more of the hardening calculation circuits in the image processing hardening unit frame by frame, for performing the second foveal process. Alternatively, the switch of each hardening calculation circuit in the image processing hardening unit is preconfigured with a corresponding switch state, based on an image processing function of the image processing system, to fixedly control one or more of the hardening calculation circuits in the image processing hardening unit, for performing the second foveal process.

Furthermore, in some embodiments of the disclosure, the display pipeline is also connected to an image rendering module, obtaining a virtual rendered image through the image rendering module, and performing the first foveal process on the virtual rendered image according to the eye movement signal. The image processing pipeline is also connected to a camera, obtaining a real scene image through the camera, and performing the second foveal process on the real scene image according to the frame synchronization signal. The image processing pipeline also transmits the real scene image that has undergone the second foveal process to the display pipeline, for layer mixing it with the virtual rendered image that has undergone or has not undergone the first foveal process.

In addition, according to the image processing method based on foveation principle provided in the second aspect of the disclosure comprises following steps: obtaining an eye movement signal of a user; transmitting the eye movement signal to a display pipeline of an image processing system to perform a first foveal process and generate a frame synchronization signal; and transmitting the frame synchronization signal to an image processing pipeline of the image processing system, for the image processing pipeline to perform a second foveal process according to the frame synchronization signal.

Furthermore, in some embodiments of the disclosure, steps of transmitting the eye movement signal to a display pipeline of an image processing system to perform a first foveal process and generate a frame synchronization signal comprise: determining a gaze point of the user according to the eye movement signal; generating a grid matrix weight map data according to the gaze point; performing the first foveal process according to the grid matrix weight map data; and generating the frame synchronization signal according to the eye movement signal and/or the grid matrix weight map data.

Furthermore, in some embodiments of the disclosure, the image processing pipeline comprises an image processing hardening unit and a software processing unit. The image processing hardening unit is configured with at least one hardening calculation circuit. Steps of transmitting the frame synchronization signal to an image processing pipeline of the image processing system, for the image processing pipeline to perform a second foveal process according to the frame synchronization signal comprise: obtaining a switch signal through the image processing hardening unit and the software processing unit; determining the hardening calculation circuit and/or the software processing unit that are required to perform the second foveal process according to the switch signal; and transmitting the frame synchronization signal to at least one of the hardening calculation circuits and/or the software processing units that are required to perform the second foveal process, for at least one of the hardening calculation circuits and/or the software processing units to independently perform the second foveal process.

Furthermore, in some embodiments of the disclosure, the image processing hardening unit is configured with hardening calculation circuits. Steps of determining the hardening calculation circuit and/or the software processing unit that are required to perform the second foveal process according to the switch signal comprise: extracting an image feature of a current frame image frame by frame through the software processing unit, and configuring the switch signal of each of the hardening calculation circuits in real-time according to the image feature, to control one or more of the hardening calculation circuits in the image processing hardening unit frame by frame for performing the second foveal process; or pre-configuring the switch state of each of the hardening calculation circuits in the image processing hardening unit based on an image processing function of the image processing system, and fixedly controlling one or more of the hardening calculation circuits in the image processing hardening unit to perform the second foveal process according to the switch state of each of the hardening calculation circuits.

Furthermore, in some embodiments of the disclosure, the display pipeline is also connected to an image rendering module, obtaining a virtual rendered image through the image rendering module, and performing the first foveal process on the virtual rendered image according to the eye movement signal. The image processing pipeline is also connected to a camera, obtaining a real scene image through the camera, and performing the second foveal process on the real scene image according to the frame synchronization signal. The image processing method also comprises the following steps after performing the second foveal process: transmitting the real scene image that has undergone the second foveal process from the image processing pipeline to the display pipeline for layer mixing it with the virtual rendered image that has undergone or has not undergone the first foveal process.

In addition, the extended reality display device provided according to the third aspect of the disclosure comprises the image processing system according to the first aspect of the disclosure.

In addition, the computer-readable storage media provided according to the fourth aspect of the disclosure is non-transitory, and stores a computer instruction thereon. The image processing method according to the first aspect of the disclosure is implemented when the computer instruction is executed by a processor.

BRIEF DESCRIPTION OF THE DRAWINGS

The above features and advantages of the disclosure will be better understood after reading the detailed description of the embodiments of the present disclosure in conjunction with the following figures. In the figures, components are not necessarily drawn to scale, and components having similar related features may have the same or similar reference numerals.

DETAILED DESCRIPTION OF EMBODIMENTS

The embodiments of the disclosure are described in the following detailed description. Although the description of the disclosure will be described in conjunction with the embodiments, this is not a limitation of the disclosure. On the contrary, the disclosure is described in connection with the embodiments to cover other alternatives or modifications that are possible in the embodiments of the disclosure. In order to provide a thorough understanding of the disclosure, many specific details are included in the following description. The disclosure may also be practiced without these details. In addition, some specific details are omitted in the description in order to avoid confusing or obscuring the disclosure.

In the description of the disclosure, it should be noted that the terms "installation", "connecting", and "connected" should be understood broadly unless explicitly stated and defined otherwise. For example, the terms "installation", "connecting", and "connected" may be either a fixed connection, a detachable connection, or an integral connection; the terms may be either a mechanical connection or an electrical connection; the terms also may be either a direct connection, an indirect connection through an intermediate medium, or an internal connection between two components. The specific meaning of the above terms in the disclosure can be understood in the art.

In addition, "up", "down", "left", "right", "top", "bottom", "horizontal", "vertical" used in the following description shall be understood as the orientation described in the paragraph and shown in the related figure. The relative term is used for convenience of description only, and does not mean that the device described therein is to be manufactured or operated in the specific orientation, and therefore should not be construed as limiting the disclosure.

Understandably, although the terms "first", "second", "third", etc. may be used to describe various components, regions, layers and/or portions to distinguish different components, regions, layers and/or portions, the order of these components, regions, layers and/or portions described above should not be limited by the terms. Therefore, a first component, region, layer and/or portion mentioned below may be also mentioned as a second component, region, layer and/or portion without departing from some embodiments of the disclosure.

As mentioned above, for the demands of high frame rate display in the XR field, existing technologies generally use display pipelines to process virtual rendering images or composite overlaid images based on foveation principle, however there is a lack of joint interaction and reuse with Image Signal Processing (ISP) pipelines. Although it can improve image processing quality and user experience, it has the drawbacks of high-power consumption and high latency. If the foveal image processing operation is simply transferred to the Display Drive Integrated Circuit (DDIC) of the ISP pipeline for processing, there will be a lack of display pipeline processing capability based on gaze points on both the ISP pipeline and DDIC, which cannot support complex and fine compensation and has limited effectiveness.

In order to overcome the above-mentioned shortcomings of existing technologies, the disclosure provides an image processing system, a method, a storage medium and an extended reality display device, which can comprehensively improve image processing effects in various aspects such as the image quality, power consumption, real-time performance and user experience of image processing, by the joint interaction and reuse of the display pipeline and the image processing pipeline, to comprehensively improve the current shortage of computing power in XR high frame rate display.

In some non-limiting embodiments, the image processing method provided in the second aspect of the disclosure can be implemented by the image processing system provided in the first aspect of the disclosure. Specifically, the image processing system is configured with a memory and a processor. The memory includes, but is not limited to, the computer-readable storage medium provided in the fourth aspect of the disclosure, on which a computer instruction is stored. The processor is connected to the memory and configured to execute the computer instruction stored on the memory to implement the above image processing method provided in the second aspect of the disclosure.

Furthermore, in some embodiments, the image processing system provided in the first aspect of the disclosure can be configured on the extended reality display device provided in the third aspect of the disclosure, for reusing the image processing data of a display pipeline and/or an image processing pipeline in the case of limited hardware resources, to save hardware computing power and improving the hardware resource utilization of the extended reality display device while ensuring the central imaging effect.

The working principle of the above image processing system and the extended reality display device will be described below in conjunction with some embodiments of some image processing methods. The embodiments of these image processing methods only provide some non-limiting implementations of the disclosure, which is intended to clearly display the main idea of the disclosure, and provide some specific proposals that are convenient for the public to implement, rather than limiting all working manners or all functions of the image processing system and the extended reality display device. Similarly, the image processing system and the extended reality display device is also a non-limiting embodiment provided by the disclosure, and does not limit the implementation subject to each step in these image processing methods.

Figure 1:
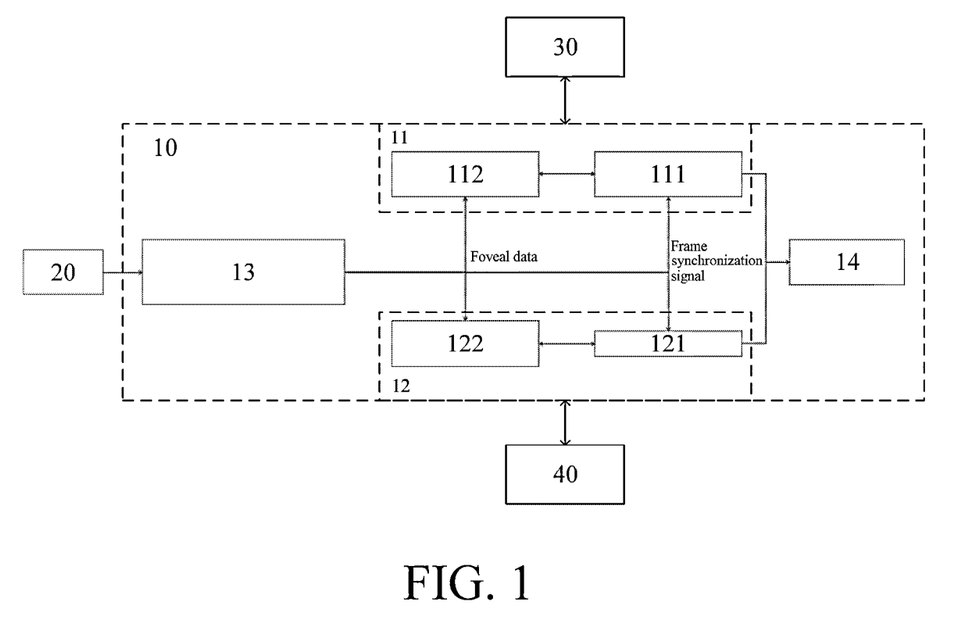
FIG. 1 shows an architectural schematic diagram of the image processing system provided according to some embodiments of the disclosure.
Figure 2:
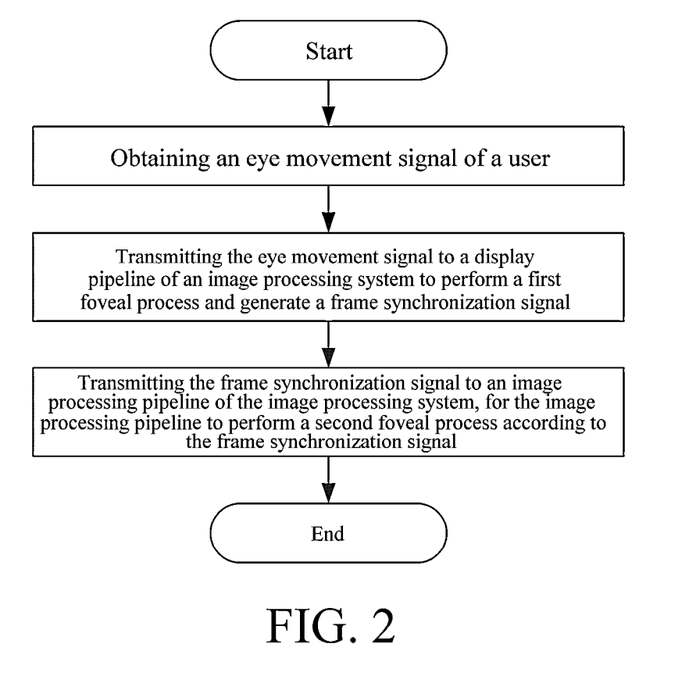
FIG. 2 shows a flowchart of the image processing method provided according to some embodiments of the disclosure.

Please refer to FIG. 1 and FIG. 2. FIG. 1 shows an architectural schematic diagram of the image processing system provided according to some embodiments of the disclosure. FIG. 2 shows a flowchart of the image processing method provided according to some embodiments of the disclosure.

As shown in FIG. 1 and FIG. 2, in some embodiments of the disclosure, the image processing system 10 may, in one embodiment, be configured with a display pipeline 11 and an image processing pipeline 12. The display pipeline 11 is connected to external devices such as an eye tracker 20 to obtain an eye movement signal of a user, and performs a first foveal process on a local first image according to the obtained eye movement signal. At the same time, the display pipeline 11 is also connected to the image processing pipeline 12 and is configured to generate a frame synchronization signal according to the obtained eye movement signal, and transmit a frame synchronization signal to the image processing pipeline 12, for the image processing pipeline 12 to perform a second foveal process on a local second image according to the frame synchronization signal.

Furthermore, in the embodiment shown as FIG. 1, the image processing system 10 may also be configured with at least one software module, such as a matrix grid generation module 13. The grid matrix generation module 13 is selected from at least one of a digital signal processor (DSP), microcontroller unit (MCU) or microprocessor, for generating a grid matrix weight map data according to the input eye movement signal, and/or performing software calculations and/or processing on the input signal and/or data. The display pipeline 11 can be connected to the eye tracker 20 via the grid matrix generation module 13 to obtain foveal related data such as the gaze position and the grid matrix weight map data, then perform the first foveal process on the local first image according to the obtained foveal related data.

In addition, in the embodiment shown as FIG. 1, the display pipeline 11 can, in one embodiment, be configured with a display hardening unit 111 and a first software processing unit 112. The display hardening unit 111 is configured with one or more transistor level hardening calculation circuits and/or memories for hardening calculation processing and storing the input signal. The first software processing unit 112 is selected from at least one of the digital signal processors (DSP), microcontroller unit (MCU) and microprocessors, and is mainly used for performing software calculations and/or software process, such as calculating the gain value for adjusting pixel brightness, calculating pixel mapping logical relationships, calculating configuration information for the relative brightness relationship of RGB three colors, and calling the format of image gamma data, on the input signals and/or data from the configuration registers and data processing parameters of each hardening calculation circuit and/or memory in the display hardening unit 111.

Furthermore, in some embodiments, the above-mentioned grid matrix generation module 13 can also be configured in the first software processing unit 112 to achieve the same effect of generating the first grid matrix weight map data according to the input eye movement signal. Herein, the display hardening unit 111 can be connected to an external eye tracker 20 via the first software processing unit 112 to obtain the eye movement signal, and perform the first foveal process according to the eye movement signal. In addition, the first software processing unit 112 can respectively connect the image processing pipeline 12 and the display hardening unit 111, and synchronously aligns the frame synchronization signal of a same frame image in the image processing pipeline 12 and the display hardening unit 111.

Specifically, in response to obtaining the eye movement signal indicating the eye deviation angle, the sight direction, the gaze point coordinate and other information from the eye tracker 20, the grid matrix generation module 13 or the first software processing unit 112 configured with a grid matrix generation program can firstly determine the gaze area data of the user according to the eye movement signal, and then generate the first grid matrix weight map data according to the gaze area data. Herein, the gaze area data indicates coordinate positions of a gaze point of the user and/or one or more surrounding pixels thereof in the image. The first grid matrix weight map data indicates an attention level of the user to regions in the image.

Figure 3:
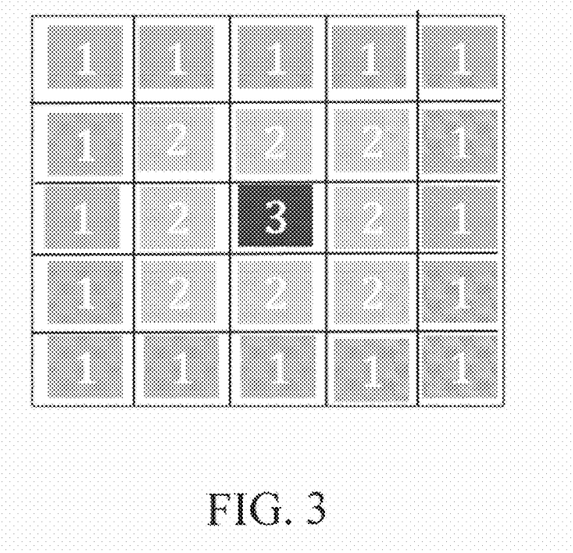
FIG. 3 shows a schematic diagram of the grid matrix weight map provided according to some embodiments of the disclosure.

Please further refer to FIG. 3. FIG. 3 shows a schematic diagram of the grid matrix weight map provided according to some embodiments of the disclosure.

As shown in FIG. 3, in the grid matrix weight map, the gaze point of the user can have the highest weight (e.g. 3), adjacent pixels near it can have higher weights (e.g. 2), and edge pixels away from the gaze point of the user can have lower weights (e.g. 1). The weights of each pixel can decrease uniformly or unevenly from the gaze point, with pixels closer to the gaze point having higher weights and relatively dense grids. On the contrary, pixels far from the gaze point have lower weights and relatively sparse grids. In this way, the hardened unit 111 can perform the first foveal process on the local first image according to the first grid matrix weight map data. In one embodiment, all pixels with the weight of 3 is processed one by one. In another embodiment, one of N adjacent pixels of the pixel with the weight of 2 is processed and the other N−1 adjacent pixels are compensated by interpolation, wherein N is a multiple of 1 or 4. In one embodiment, one of 4N adjacent pixels of the pixel with the weight of 1 is processed and the other 4N−1 adjacent pixels are compensated by interpolation, wherein N is a multiple of 1 or 4. By performing the first foveal process on the local first image, the disclosure can perform the first foveal process on the local first image in the display pipeline 11 to reduce the data volume of the first image, to improve the image processing quality and user experience while ensuring the central imaging effect of the gaze area of the user, and improving the hardware resource utilization of the image processing system 10.

In addition, the first software processing unit 112 can also generate a frame synchronization signal according to the obtained eye movement signal, the determined gaze area data, and/or the generated first grid matrix weight map data, and transmit the frame synchronization signal to the image processing pipeline 12, for the image processing pipeline 12 to perform a second foveal process according to the frame synchronization signal. Taking synchronous alignment eye movement signal as an example, the first software processing unit 112 can add timestamps to the obtained eye movement signal to generate the frame synchronization signal, and transmit the eye movement signal with the timestamps to the image processing pipeline 12.

As shown in FIG. 1, the image processing pipeline 12 can, in one embodiment, be configured with an image processing hardening unit 121 and a second software processing unit 122. The image processing hardening unit 121 is configured with one or more transistor level hardening calculation circuits and/or memories, for hardening calculation processing and storing the input signal. The second software processing unit 122 is selected from at least one of a digital signal processor (DSP), microcontroller unit (MCU), microprocessor (Microprocessor), and is configured with at least one software program, including automatic exposure (AE), automatic white balance (AWB), autofocus (AF), anti-flickering, auto lens shadow correction (hereinafter referred to as the 5A module of the ISP), and grid matrix generation module, etc., for generating the second grid matrix weight map data according to the input frame synchronization signal, and/or for preforming software calculations and/or processing, such as setting and statistically analyzing the grid of image information involved in automatic exposure and/or automatic white balance, and adjusting the algorithm logic of application statistics based on the foveal characteristics use of the 5A modules, on the input signals and/or data from the configuration registers and data processing parameters of each hardening calculation circuit and/or memory in the image processing hardening unit 121.

Specifically, the second software processing unit 122 can be connected to the first software processing unit 112 of the display pipeline 11, and obtain the frame synchronization signal such as the eye movement signal with timestamps and/or the first grid matrix weight map data with timestamps and other foveal data through the first software processing unit 112. Afterwards, the second software processing unit 122 can generate the second grid matrix weight map data according to the eye movement signal as mentioned above, and perform the second foveal process on the second image of the local corresponding frame based on at least one software programs (such as the 5A module) according to the timestamp and the generated second grid matrix weight map data. In some embodiments, the resolution and weight of the second grid matrix weight map data generated by the second software processing unit 122 are set according to parameters such as the resolution of the second image, which can be different from the first grid matrix weight map data generated by the first software processing unit 112, to further adapt to the processing requirements of the second image and improving the image processing quality of the image processing pipeline 12.

In addition, the image processing hardening unit 121 can also be directly connected to the first software processing unit 112 of the display pipeline 11, or connected to the first software processing unit 112 via the second software processing unit 122 to directly or indirectly obtain the frame synchronization signal via the display pipeline 11. Herein, the frame synchronization signal can be the first grid matrix weight map data generated by the first software processing unit 112, or the second grid matrix weight map data generated by the second software processing unit 122. Each hardening calculation circuit in the image processing hardening unit 121 can respectively perform the second foveal process according to the obtained first and/or second grid matrix weight map data, to reduce the amount of data in the second image. This reduces the power consumption and delay of the image processing system while ensuring the central imaging effect of the gaze area of the user, and improves the hardware resource utilization of the image processing system 10.

Furthermore, by using the first grid matrix weight map data as the frame synchronization signal, the image processing hardening unit 121 can directly use the obtained first grid matrix weight map data for the second foveal process, to further save software computing power, saving hardware resources of the hardening calculation circuit, and improving the real-time performance of image processing. Especially in the embodiments of mixed reality (MR) display, by using the same grid matrix weight map data to synchronize the foveal process of the virtual rendered image (i.e. the first image) and the real scene image (i.e. the second image), the disclosure can effectively improve the adaptability of virtual objects to ISP real scenes and ensure that their resolution transitions are similar, to achieve a natural transition between the virtual rendered image and the real scene image.

Figure 4:
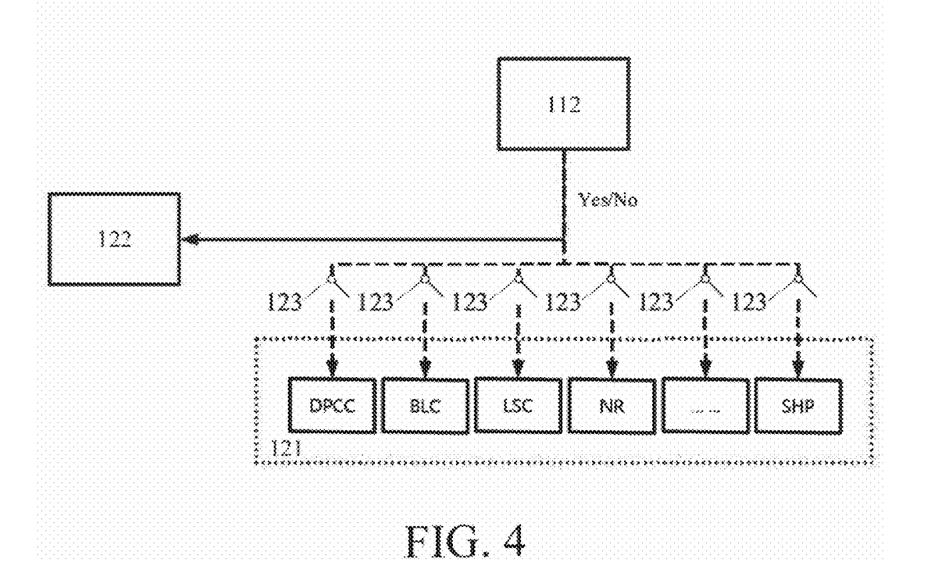
FIG. 4 shows an architectural schematic diagram of the image processing pipeline provided according to some embodiments of the disclosure.

Please further refer to FIG. 4, which illustrates the architectural schematic diagram of the image processing pipeline provided according to some embodiments of the disclosure.

In the embodiment shown in FIG. 4, the image processing hardening unit 121 can, in one embodiment, be configured with one or more transistor level hardening computing circuits for defect pixel compensation (DPCC), demosaic, black level correction (BLC), lens shadow correction (LSC), noise reduction (NR), sharpening (SHP), color calibration (CCM), gamma correction, color space conversion (CSC), etc.

Moreover, the second software processing unit 122 and/or at least one hardened computing circuit is configured with independent switches 123 separately. Afterwards, in response to the input of the local second image, the image processing pipeline 12 can obtain switch signals via the image processing hardening unit 121 and the software processing unit 122 respectively, and determine the hardening calculation circuit and/or software processing unit 122 that needs to perform the second foveal process according to the switch signals. Afterwards, if the switch signal of the software processing unit 122 and/or any one or more hardened computing circuits is ON, the image processing pipeline 12 can determine that it needs to perform the second foveal process, to transmit the frame synchronization signal to it, for the at least one hardened computing circuit and/or software processing unit 122 to independently perform the second foveal process. On the contrary, if the switch signal of the software processing unit 122 and/or any one or more hardened computing circuits is OFF, the image processing pipeline 12 can determine that it does not need to perform the second foveal process, to skip the operation of the second foveal process to provide personalized foveal process functionality.

In some embodiments, the above-mentioned switch signals can be preset according to the specific functions of the image processing system 10 before it leaves the factory or is installed for operation. In this way, the image processing system 10 can fixedly control one or more hardening calculation circuits in the image processing hardening unit 121 according to preset or customized processing methods, and perform preset or customized second foveal process on the local second image.

Furthermore, in some embodiments, the above-mentioned switch signals may also be set frame by frame, by the second software processing unit 122. Specifically, during the XR display process, the image processing pipeline 12 can use a pre-trained artificial intelligence (AI) model to extract the image features of the second image of a current frame image frame by frame through the second software processing unit 122 to determine whether it needs to perform foveal process and specific information such as the grid matrix it needs to use. Afterwards, the image processing pipeline 12 can configure the switch signals of each of the hardening calculation circuits in real time according to the determination result of the foveal process operation required for the second image of the current frame, and synchronously obtain and/or generate specific information related to foveal process operations such as the grid matrix. In this way, each of the hardening calculation circuits will perform personalized foveal process on the second image of the current frame according to the switch signal configured in real-time by the second software processing unit 122. Similarly, the image processing pipeline 12 can control one or more hardening calculation circuits in the image processing hardening unit 121 frame by frame to dynamically perform personalized second foveal process of the second image in each frame.

The architecture of independent software computing units 112 and 122 configured on the display pipeline 11 and the image processing pipeline 12 shown in FIG. 1 is only a non-limiting embodiment provided by the disclosure, aiming to clearly demonstrate the main concept of the disclosure and provide a specific solution for public implementation, rather than limiting the scope of protection of the disclosure.

Optionally, in other embodiments, the display pipeline and image processing pipeline may also be configured with different hardening units and share the same software processing unit. In this way, the software processing unit can connect the display hardening unit and the image processing hardening unit separately, and synchronously transmit the frame synchronization signal such as the eye movement signal, the grid matrix weight map data, and/or the foveal data between the display hardening unit and the image processing hardening unit to achieve joint interaction and reuse of data between the display pipeline and the image processing pipeline. The specific working mode of this software processing unit is similar to the first software processing unit and second software processing unit mentioned above, and will not be repeated here.

In addition, please continue to refer to FIG. 1. In some embodiments of mixed reality (MR) display, the display pipeline 11 is also connected to an image rendering modules 30 such as the central processing unit (CPU) and the graphics processing unit (GPU) of the mixed reality display device, obtains the virtual rendered images via the image rendering modules 30, and preforms the first foveal process on the virtual rendered image according to the eye movement signal. In addition, the image processing pipeline 12 is also connected to an image acquisition device such as a binocular camera 40, which obtains a real scene image through the binocular camera 40, and performs a second foveal process on the real scene image according to the frame synchronization signal provided by the display pipeline 11. Herein, due to the significant difference in resolution between virtual rendered images and real images, the first grid matrix weight map subjected to the first foveal process and the second grid matrix weight map subjected to the second foveal process can also be different, involving significant resolution differences.

Furthermore, after performing the second concavity processing, the image processing pipeline 12 can also add a timestamp to the real scene image that has undergone the second foveal process, and synchronously transmit it from the image processing pipeline 12 to the display pipeline 11 for layer stacking, and output it to the subsequent module 14 for mixed reality output display. In this way, the disclosure can further reduce the amount of data in real-time images transmitted between pipelines, to save hardware computing power.

In addition, the display pipeline 11 can find the virtual rendered image corresponding to the frame according to the timestamp of the real scene image, and mix it with the real scene image for layer mixing and mixed reality output display. Herein, the virtual rendered image can be a compressed image processed by the first foveal process. The display pipeline 11 can directly send the mixed image to the subsequent module 14 after completing layer mixing, for mixed reality output display.

Optionally, in other embodiments, the above-mentioned virtual rendered image may also be an original virtual rendered image that has not undergone first foveal process. In this way, after completing layer mixing, the display pipeline 11 can perform the first foveal process on the mixed image according to the eye movement signal of the user, and then send it to the subsequent module 14 for mixed reality output display.

In summary, the image processing system, the image processing method, the extended reality display device, and computer-readable storage medium provided by the disclosure can comprehensively improve image processing effects in various aspects such as the image quality, power consumption, real-time performance and user experience of image processing, by the joint interaction and reuse of the display pipeline and the image processing pipeline, to comprehensively improve the current shortage of computing power in XR high frame rate display.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein.

Signals and data can be represented using any of a variety of different technologies and techniques. In one embodiment, the data, instructions, commands, information, signals, bits, symbols and chips cited throughout the above description may be represented by voltage, current, electromagnetic waves, magnetic fields or magnetic particles, optical fields or optical particles, or any combination thereof.

Various illustrative logic blocks, modules, circuits and algorithm steps described in combination with the embodiments disclosed herein can be implemented as electronic hardware, computer software or a combination of both. In order to clearly explain the interchangeability of hardware and software, various illustrative components, blocks, modules, circuits and steps are generally described above in the form of their functionality. Whether such functionality is implemented as hardware or software depends on the specific application and design constraints imposed on the overall system. Technicians can implement the described functionality in different ways for each specific application, but such implementation decisions should not be interpreted as leading to departure from the scope of the disclosure.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, multiple microprocessors, one or more microprocessors cooperating with the DSP core or any other such configuration.

The steps of the method or algorithm described in conjunction with the embodiments disclosed in this disclosure can be directly embodied in hardware, in software modules executed by processors, or in a combination of the two. Software modules can reside in a RAM memory, a flash memory, a ROM memory, an EPROM memory, an EEPROM memory, a register, a hard disk, a removable disk, a CD ROM, or any other form of storage medium known in the art. An exemplary storage medium is coupled to a processor to enable the processor to read and write information from/to the storage medium. In an alternative proposal, the storage medium can be integrated into the processor. The processor and the storage medium can reside in an ASIC. The ASIC can reside in a user terminal. In an alternative proposal, the processor and the storage medium can reside as separate components in a user terminal.

The invention claimed is:

1. An image processing system based on foveation principle, comprising:
a display pipeline and an image processing pipeline, wherein the display pipeline obtains an eye movement signal of a user and performs a first foveal process according to the eye movement signal, wherein the display pipeline also generates a frame synchronization signal according to the eye movement signal and transmits the frame synchronization signal to the image processing pipeline, for the image processing pipeline to perform a second foveal process according to the frame synchronization signal.

2. The image processing system according to claim 1, wherein the frame synchronization signal comprises at least one of the eye movement signal, a gaze area data and a grid matrix weight map data, wherein the gaze area data indicates at least one of coordinate positions of a gaze point of the user and a surrounding pixel thereof in an image, and the grid matrix weight map data indicates an attention level of the user to a plurality of regions in the image.

3. The image processing system according to claim 2, wherein the display pipeline is configured as:
  determining the gaze area data of the user according to the eye movement signal;
  generating the grid matrix weight map data according to the gaze area data;
  performing the first foveal process according to the grid matrix weight map data; and
  generating the frame synchronization signal according to at least one of the eye movement signal, the gaze area data and the grid matrix weight map data.

4. The image processing system according to claim 1, wherein the display pipeline comprises a display hardening unit and a first software processing unit, wherein the display hardening unit is connected to an eye tracker via the first software processing unit to obtain the eye movement signal, and performs the first foveal process according to the eye movement signal,
  the first software processing unit connects the image processing pipeline to the display hardening unit, and synchronously aligns the frame synchronization signal of a same frame image in the image processing pipeline and the display hardening unit.

5. The image processing system according to claim 1, wherein the image processing pipeline comprises an image processing hardening unit and a second software processing unit, wherein the image processing hardening unit is connected to the display pipeline, and obtains the frame synchronization signal through the display pipeline to perform the second foveal process based on at least one hardening calculation circuit according to the frame synchronization signal,
  the second software processing unit is connected to the display pipeline, and obtains the frame synchronization signal through the display pipeline to perform the second foveal process based on at least one software program therein according to the frame synchronization signal.

6. The image processing system according to claim 5, wherein the image processing hardening unit is configured with a plurality of hardening calculation circuits, wherein at least one of the plurality of hardening calculation circuits is configured with an independent switch, and the at least one of the plurality of hardening calculation circuits performs independent second foveal process according to a switch signal of a corresponding independent switch.

7. The image processing system according to claim 6, wherein the second software processing unit extracts an image feature of a current frame image frame by frame, and configures the switch signal of the corresponding independent switch in real-time according to the image feature, to control one or more of the plurality of hardening calculation circuits in the image processing hardening unit frame by frame, for performing the second foveal process, or
  the corresponding independent switch of each of the plurality of hardening calculation circuit in the image processing hardening unit is preconfigured with a corresponding switch state, based on an image processing function of the image processing system, to fixedly control one or more of the plurality of hardening calculation circuits in the image processing hardening unit, for performing the second foveal process.

8. The image processing system according to claim 1, wherein the display pipeline is also connected to an image rendering module to obtain a virtual rendered image through the image rendering module and to perform the first foveal process on the virtual rendered image according to the eye movement signal,
  the image processing pipeline is also connected to a camera to obtain a real scene image through the camera and to perform the second foveal process on the real scene image according to the frame synchronization signal,
  the image processing pipeline also transmits the real scene image that has undergone the second foveal process to the display pipeline, for layer mixing it with the virtual rendered image that has undergone or has not undergone the first foveal process.

9. An extended reality display device, comprising the image processing system according to claim 1.

10. An image processing method based on foveation principle, comprising following steps:
  obtaining an eye movement signal of a user;
  transmitting the eye movement signal to a display pipeline of an image processing system to perform a first foveal process and generate a frame synchronization signal; and
  transmitting the frame synchronization signal to an image processing pipeline of the image processing system, for the image processing pipeline to perform a second foveal process according to the frame synchronization signal.

11. The image processing method according to claim 10, wherein steps of transmitting the eye movement signal to the display pipeline of the image processing system to perform the first foveal process and generate the frame synchronization signal comprise:
  determining a gaze point of the user according to the eye movement signal;
  generating a grid matrix weight map data according to the gaze point;
  performing the first foveal process according to the grid matrix weight map data; and
  generating the frame synchronization signal according to at least one of the eye movement signal and the grid matrix weight map data.

12. The image processing method according to claim 10, wherein the image processing pipeline comprises an image processing hardening unit and a software processing unit, the image processing hardening unit is configured with at least one hardening calculation circuit, and steps of transmitting the frame synchronization signal to the image processing pipeline of the image processing system, for the image processing pipeline to perform the second foveal process according to the frame synchronization signal comprise:
  obtaining a switch signal through the image processing hardening unit and the software processing unit;
  determining at least one of the at least one of hardening calculation circuit and the software processing unit that are required to perform the second foveal process according to the switch signal; and transmitting the frame synchronization signal to at least one of the at least one hardening calculation circuit and the software processing unit that are required to perform the second foveal process, for at least one of the at least one hardening calculation circuit and the software processing unit to independently perform the second foveal process.

13. The image processing method according to claim 12, wherein the image processing hardening unit is configured with a plurality of hardening calculation circuits, and steps of determining at least one of the at least one hardening calculation circuit and the software processing unit that are required to perform the second foveal process according to the switch signal comprise:

extracting an image feature of a current frame image frame by frame through the software processing unit, and configuring the switch signal of each of the plurality of hardening calculation circuits in real-time according to the image feature, to control one or more of the plurality of hardening calculation circuits in the image processing hardening unit frame by frame for performing the second foveal process; or pre-configuring a switch state of each of the plurality of hardening calculation circuits in the image processing hardening unit based on an image processing function of the image processing system, and fixedly controlling one or more of the plurality of hardening calculation circuits in the image processing hardening unit to perform the second foveal process according to the switch state of each of the plurality of hardening calculation circuits.

14. The image processing method according to claim 10, wherein the display pipeline is also connected to an image rendering module, obtaining a virtual rendered image through the image rendering module, and performing the first foveal process on the virtual rendered image according to the eye movement signal, the image processing pipeline is also connected to a camera, obtaining a real scene image through the camera, and performing the second foveal process on the real scene image according to the frame synchronization signal, and the image processing method also comprises the following steps after performing the second foveal process:

transmitting the real scene image that has undergone the second foveal process from the image processing pipeline to the display pipeline for layer mixing it with the virtual rendered image that has undergone or has not undergone the first foveal process.

15. A non-transitory computer-readable storage medium, storing a computer instruction thereon, wherein the image processing method according to claim 10 is implemented when the computer instruction is executed by a processor.

* * * * *